United States Patent
Sillanpaa et al.

(10) Patent No.: US 7,293,479 B2
(45) Date of Patent: Nov. 13, 2007

(54) SPEED AND TEMPERATURE SENSING IN SEPARATE CAVITIES IN A SINGLE SENSING HEAD

(75) Inventors: Donald C. Sillanpaa, North Port, FL (US); Veeragandham Bhanumurthy, Bangalore (IN); Raja Narayanasamy, Bangalore (IN); Dathathreya Durgadhahall Ganesh, Bangalore (IN); Jithesh M Radhakrishnan, Kerala (IN)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 11/287,418

(22) Filed: Nov. 23, 2005

(65) Prior Publication Data

US 2007/0119249 A1    May 31, 2007

(51) Int. Cl.
*G01D 11/24*    (2006.01)
(52) U.S. Cl. ....................... 73/866.5; 73/431
(58) Field of Classification Search .......... 73/489–499, 73/431, 866.5, 493
See application file for complete search history.

(56) References Cited

U.S. PATENT DOCUMENTS

| | | | |
|---|---|---|---|
| 4,150,786 A | 4/1979 | Sable | 236/91 A |
| 4,371,861 A | 2/1983 | Abdelrahman et al. | 338/25 |
| 4,389,876 A | 6/1983 | Szonntagh | 73/27 R |
| 4,688,949 A | 8/1987 | Hatakenaka | 374/183 |
| 5,694,897 A | 12/1997 | Kaji | 123/339.15 |
| 5,726,624 A | 3/1998 | Caffee et al. | 338/28 |
| 6,644,849 B1 | 11/2003 | Conner | 374/14 |
| 6,695,483 B2 * | 2/2004 | Sakatani et al. | 384/448 |
| 6,771,063 B2 | 8/2004 | Stolfus | 324/166 |
| 6,788,054 B2 * | 9/2004 | Collins et al. | 324/262 |
| 6,904,798 B2 * | 6/2005 | Boucher et al. | 73/170.02 |
| 2005/0017709 A1 | 1/2005 | Stolfus et al. | 324/174 |

FOREIGN PATENT DOCUMENTS

| | | |
|---|---|---|
| EP | 1324048 A | 7/2003 |
| EP | 1415698 A | 5/2004 |
| WO | WO 98/08063 A | 2/1998 |
| WO | WO 03/067021 A | 8/2003 |

\* cited by examiner

*Primary Examiner*—Helen Kwok
(74) *Attorney, Agent, or Firm*—Kermit D. Lopez; Luis M. Ortiz

(57) ABSTRACT

A sensor apparatus includes a sensor assembly for maintaining multiple and varying sensor components, wherein the sensor assembly comprises a molded sensor head configured to include a first cavity and a second cavity. A first sensor of a first sensor type can be located and maintained within the first cavity. A second sensor of a second sensor type is generally located and maintained within the second cavity, wherein the first sensor type is different from the second sensor type. The first sensor and the second sensor are respectively packaged into the separate first and second cavities within the molded sensor head of the sensor assembly to provide a sensor apparatus that provides for multiple and varying sensor capabilities.

20 Claims, 4 Drawing Sheets

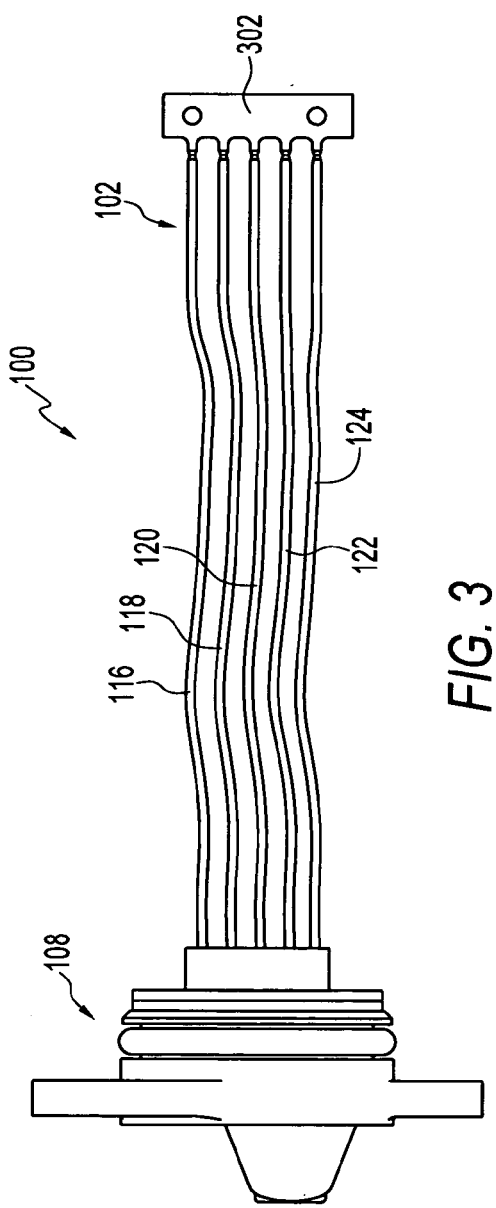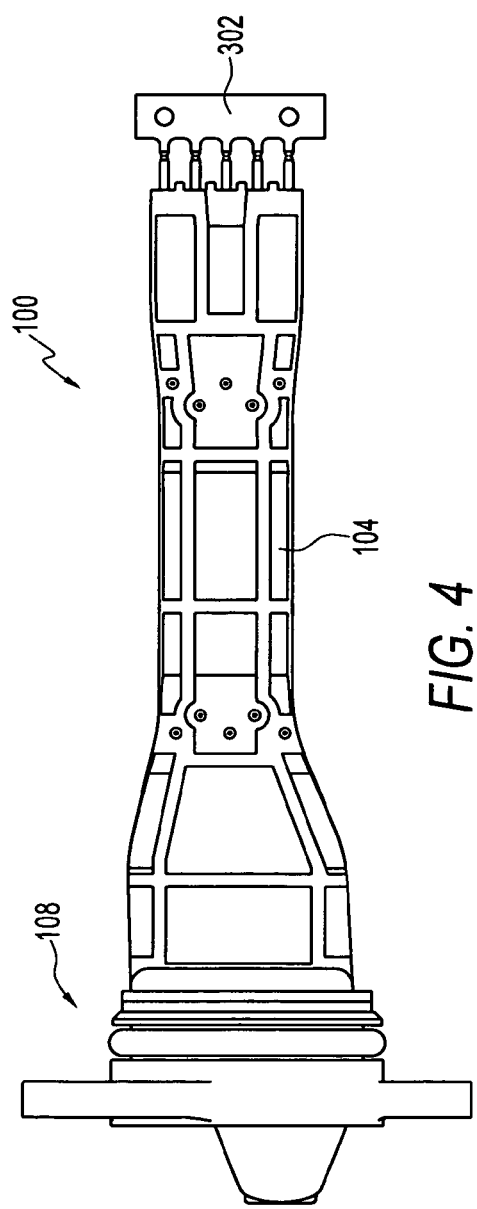

SPEED AND TEMPERATURE SENSING IN SEPARATE CAVITIES IN A SINGLE SENSING HEAD

TECHNICAL FIELD

Embodiments are generally related to sensing devices and components thereof. Embodiments are also related to speed and temperature sensor devices. Embodiments are additionally related to packaging devices for maintaining multiple and varying sensor components within a single sensor assembly.

BACKGROUND OF THE INVENTION

Many automotive and other vehicles are equipped with electronic control systems that regulate various components of the vehicle, such as speed and temperature. These electronic control systems are utilized to control the components based on information represented by output signals from various sensors for detecting operating conditions. A vehicle speed sensor, for example, is a device, which is generally utilized in an automobile to sense vehicle speed and send this information to the vehicle's onboard computer. In order to control engine performance electronically, it is often necessary to provide a variety of signals to the engine control module. These signals indicate the status of the parameter being detected and to which the control must respond. Among status signals necessary is a signal that is indicative of the vehicle speed.

Temperatures sensors are also important in a number of applications, not merely automotive or vehicle applications. Temperature sensors that are used in conjunction with high-temperature applications, for example, typically comprise a metallic tube in which a temperature sensitive element is disposed inside one end with conductive wires extending within the tube from the temperature sensitive element to an opening at the other end of the tube. The metallic tube is inserted through a wall of the high-temperature application or environment to permit the temperature sensitive element to be placed in thermal communication with an internal cavity of the high-temperature application. Temperature sensors are utilized for a variety of applications, including low-temperature applications and applications that require ambient air temperature information, such as that required in modern aircraft.

A continuing need exists for sensor devices that can detect both temperature and speed. One of the problems with conventional methodologies and systems for combining speed and temperature sensor devices into a single package is that they are inflexible and subject to environmental conditions. Additionally, it is difficult to package such sensor devices into small compact packages without suffering a loss in the quality of the resulting detection data.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for an improved speed and temperature sensor.

It is a further aspect of the present invention to provide for an improved package for maintaining multiple and varying sensor components within a single sensor assembly.

The aforementioned aspects and other objectives and advantages can now be achieved as described herein. A sensor apparatus is disclosed, which includes a sensor assembly for maintaining multiple and varying sensor components, wherein the sensor assembly comprises a molded sensor head configured to include a first cavity and a second cavity. A first sensor of a first sensor type can be located and maintained within the first cavity. A second sensor of a second sensor type is generally located and maintained within the second cavity, wherein the first sensor type is different from the second sensor type. The first sensor and the second sensor are respectively packaged into the separate first and second cavities within the molded sensor head of the sensor assembly to provide a sensor apparatus that provides for multiple and varying sensor capabilities.

The first sensor can be, for example, a speed sensor, while the second sensor can be, for example, a temperature sensor. The speed sensor can comprise, for example, a Hall-effect integrated circuit component. The temperature sensor can be provided as, for example, a thermistor. The molded sensor head is generally surrounded by an O-ring in association with a plurality of bushing components. The first and second sensors can be respectively potted into the first and second cavities utilizing a conductive potting. In general, the sensor head is connected to a sensor body that forms a part of the sensor assembly, wherein the sensor body is over molded over a terminal comprising a plurality of electrical terminal leads that engage the sensor head and the first and second sensors.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIGS. 3 and 4 respectively illustrate "before" and "after" over-molded views of the sensor apparatus depicted in FIG. 1, in accordance with a preferred embodiment.

DETAILED DESCRIPTION

The particular values and configurations discussed in these non-limiting examples can be varied and are cited merely to illustrate at least one embodiment and are not intended to limit the scope thereof.

Figure 1:
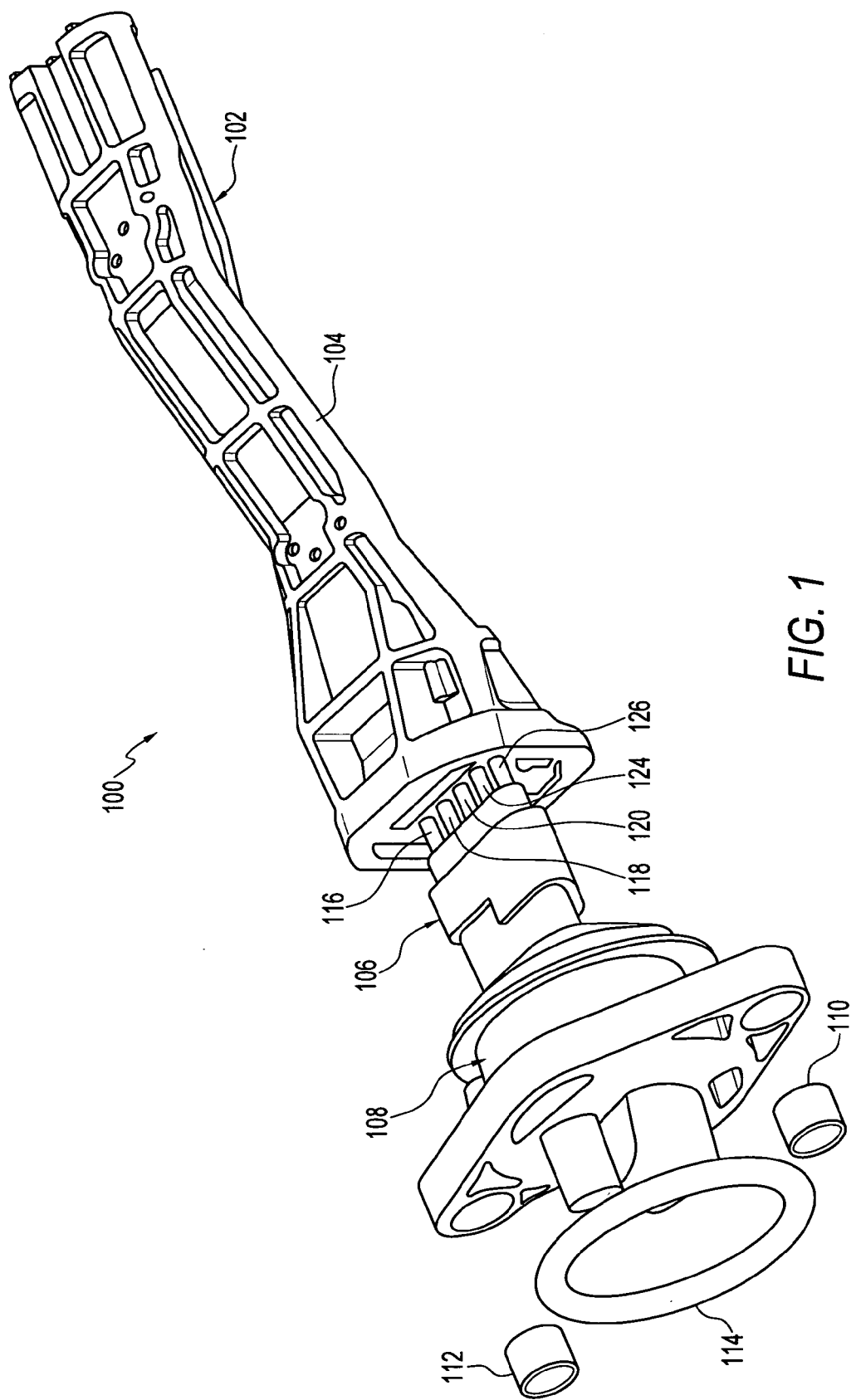
FIG. 1 illustrates an exploded view of a sensor apparatus, which can be implemented in accordance with a preferred embodiment.

FIG. 1 illustrates an exploded view of a sensor apparatus 100, which can be implemented in accordance with a preferred embodiment. Apparatus 100 includes a molded sensor head 108 in association with an O-ring 114 and one or more steel bushes 110, 112. A sensor body 104 is also provided, which can be utilized to maintain and protect a terminal 102 that is composed of one or more electrical terminal leads 116, 118, 120, 124, and 126 that are protected by a cover 106 that can engage the sensor head 108. Note that the sensor body 104 and the sensor head 108 can together form a sensor assembly, together with other sensor components, such as, for example electrical terminal leads 116, 118, 120, 124, and 126 for details regarding this discrepancy and cover 106, and so forth.

Figure 2:
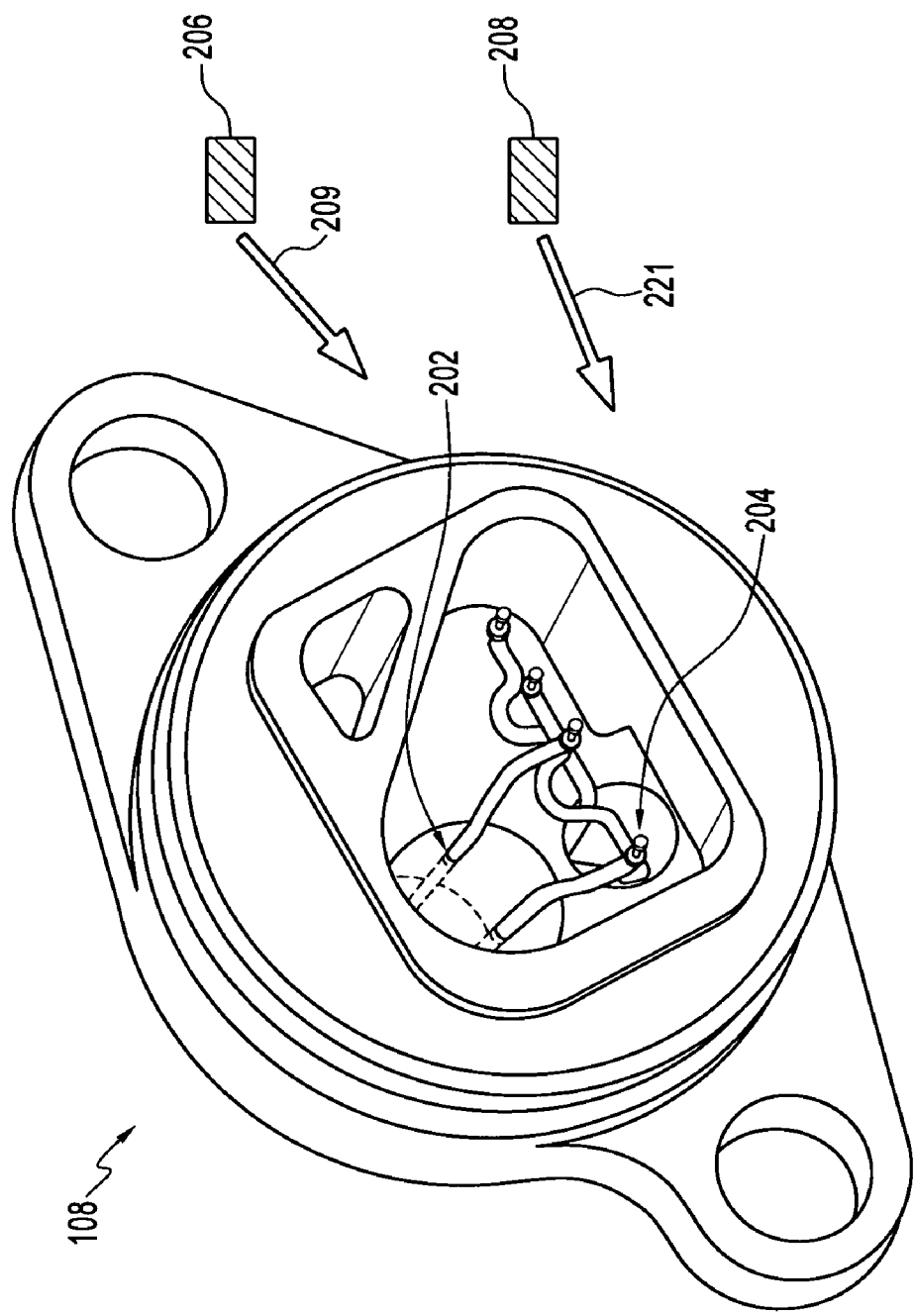
FIG. 2 illustrates a perspective view of a sensor head, which can be adapted for use with the sensor apparatus illustrated in FIG. 1, in accordance with a preferred embodiment.

FIG. 2 illustrates a perspective view of the sensor head 108 depicted in FIG. 1, in accordance with a preferred embodiment. Sensor head 108 is molded to include two cavities 202, 204. Sensors can be inserted into position within cavity 202, 204 and potted with thermally conductive potting as indicated respectively by arrows 209 and 211. Cavity 202 can constitute, for example, a first cavity for maintaining a first sensor 206 of a first sensor type, while cavity 204 can constitute a second cavity for maintaining a second sensor 208 of a second sensor. That is, the first sensor 206 can be, for example, a speed sensor, while the second sensor 208 can be, for example, a temperature sensor.

Sensor apparatus 100 thus includes a sensor assembly for maintaining multiple and varying sensor components 206, 208. The molded sensor head 108 is configured to include the first cavity 202 and the second cavity 204. The first sensor 206 of a first sensor type can be located and maintained within the first cavity 202. The second sensor 208 of a second sensor type can be located and maintained within the second cavity 204, wherein the first sensor type is different from the second sensor type. The first sensor 206 and the second sensor 208 are respectively packaged into the separate first and second cavities 202, 204 within the molded sensor head 108 of the sensor assembly to provide a sensor apparatus 100 that provides for multiple and varying sensor capabilities, such as a combination speed and temperature sensor device. The two sensing elements or sensors 206, 208 are packaged into separate cavities 202, 204 within a single molded sensor head 108, thus physically separating the sensors 206, 208, yet providing for a single sensor assembly and apparatus 100 as desired by a customer or user.

FIGS. 3 and 4 respectively illustrate respective "before" and "after" over-molded views of the sensor apparatus 100 depicted in FIG. 1, in accordance with a preferred embodiment. Note that in FIGS. 1-5, identical or similar parts or elements are generally indicated by identical reference numerals. Thus, FIG. 3 shows electrical terminal leads 116, 118, 120, 122, 124 and an end piece 302 thereof which form a part of the overall terminal 102 prior to over-molding. Terminal 102 is shown in FIG. 3 as engaged to the sensor head 108. In FIG. 4, the sensor body 104 is disclosed as molded over terminal 102 and electrical terminal leads 116, 118, 120, 122, and 124. The end piece 302 is shown in FIG. 4 as a strip cut-off portion after over-molding. Note that the apparatus 100 can be cored out for uniform wall thickness to avoid sink marks and warpage, depending upon design considerations.

Figure 5:
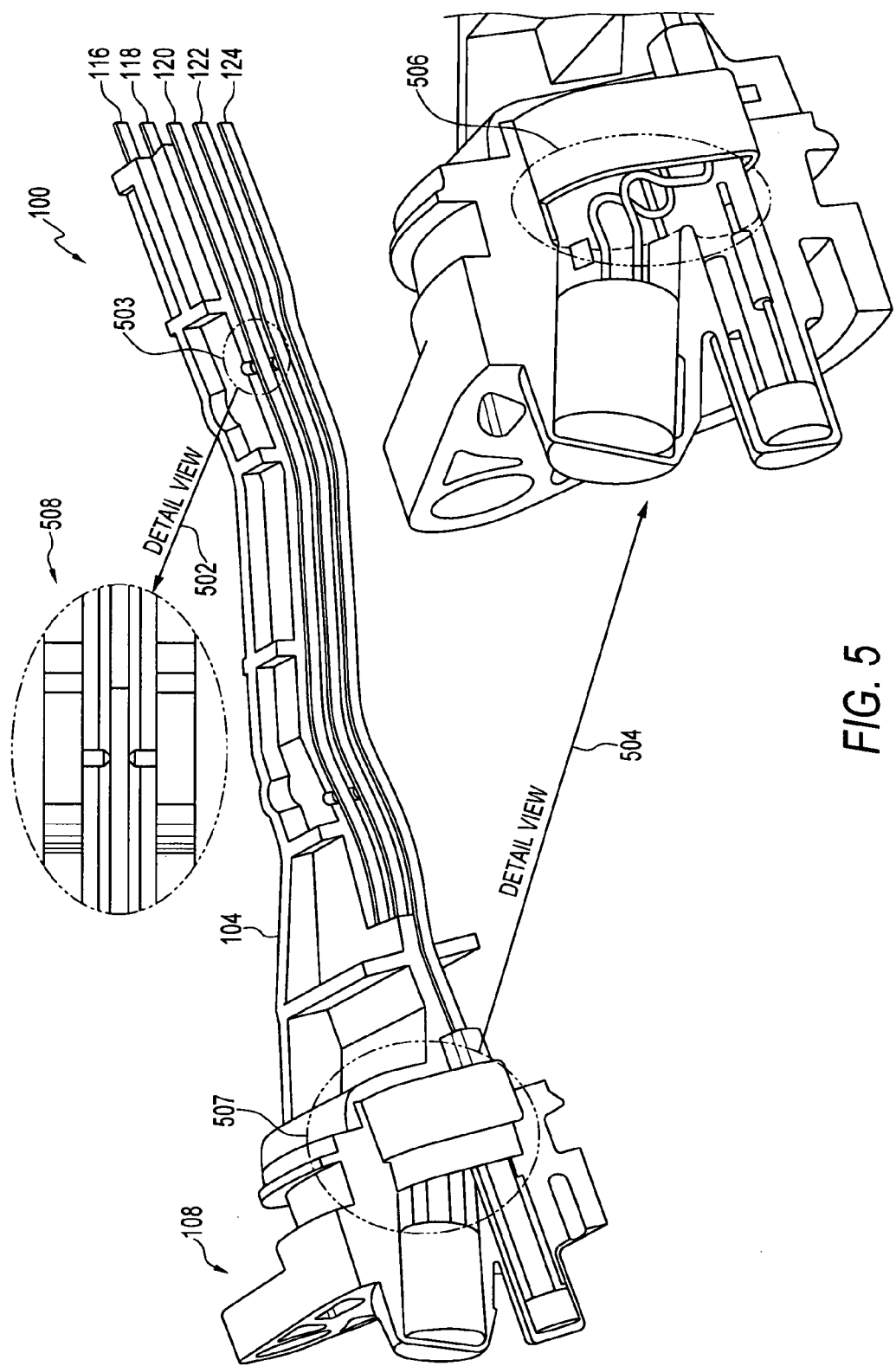
FIG. 5 illustrates sectional views of portions of the sensor apparatus described in FIGS. 1-4, in accordance with a preferred embodiment.

FIG. 5 illustrates sectional views of portions of the sensor apparatus 100 described in FIGS. 1-4, in accordance with a preferred embodiment. In FIG. 5, arrow 502 reflects a detailed view of a terminal connection area 503, while arrow 504 reflects a detailed view of portion 507 of the sensor head 108. A further detail view of a portion 506 of sensor head 108 is also depicted in FIG. 5.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A sensor apparatus:
   a single sensor assembly for maintaining multiple and varying sensor components, wherein said sensor assembly comprises a single molded sensor head configured to include a first cavity and a second cavity;
   a first sensor of a first sensor type located and maintained within said first cavity;
   a second sensor of a second sensor type located and maintained within said second cavity, wherein said first sensor type is different from said second sensor type, such that said first sensor and said second sensor are respectively packaged into said first cavity and said second cavity within said single molded sensor head of said sensor assembly to provide a sensor apparatus that provides for multiple and varying sensor capabilities, and wherein said first cavity is separate from said second cavity of said sensor apparatus, thereby providing separate cavities within said single molded sensor head, thereby physically separating said first sensor from said second sensor, yet providing for said single sensor assembly and said sensor apparatus as desired by a customer or user.

2. The apparatus of claim 1 wherein said first sensor comprises a speed sensor.

3. The apparatus of claim 1 wherein said second sensor comprises a temperature sensor.

4. The apparatus of claim 1 wherein said first sensor comprises a speed sensor and said second sensor comprises a temperature sensor.

5. The apparatus of claim 4 wherein said speed sensor comprises a Hall-effect integrated circuit com ponent.

6. The apparatus of claim 4 wherein said temperature sensor comprises a thermistor.

7. The apparatus of claim 1 wherein said single molded sensor head is surrounded by an O-ring in association with a plurality of bushing components.

8. The apparatus of claim 1 wherein said first and second sensors are respectively potted into said first and second cavities utilizing a thermally-conductive potting.

9. The apparatus of claim 8 wherein said single molded sensor head is connected to an elongated a sensor body that forms a part of said single sensor assembly, wherein said elongated sensor body is over molded over a terminal comprising a plurality of electrical terminal leads that engage said single molded sensor head and said first and second sensors.

10. A sensor apparatus:
    a single sensor assembly for maintaining multiple and varying sensor components, wherein said sensor assembly comprises a single molded sensor head configured to include a first cavity and a second cavity;
    a speed sensor located and maintained within said first cavity;
    a temperature sensor type located and maintained within said second cavity, wherein said speed sensor and said temperature sensor are respectively packaged into said first cavity and said second cavity within said molded sensor head of said sensor assembly to provide a sensor apparatus that provides for speed and temperature sensor capabilities, and wherein said first cavity is separate from said second cavity of said sensor apparatus, thereby providing separate cavities within said single molded sensor head, thereby physically separating said first sensor from said second sensor, yet providing for said single sensor assembly and said sensor apparatus as desired by a customer or user.

11. The apparatus of claim 10 wherein said speed sensor comprises a Hall-effect integrated circuit component.

12. The apparatus of claim 10 wherein said temperature sensor comprises a thermistor.

13. The apparatus of claim 10 wherein said speed sensor and said temperature sensor are respectively potted into said first and second cavities utilizing a thermally-conductive potting.

14. The apparatus of claim 13 wherein said sensor head is connected to an elongated a sensor body that forms a part of said sensor assembly, wherein said elongated sensor body is over molded over a terminal comprising a plurality of electrical terminal leads that engage said sensor head and said speed sensor and said temperature sensor and wherein said plurality of electrical terminals are protected by a cover that engages said sensor head.

15. A method for forming a sensor apparatus:
providing a single sensor assembly for maintaining multiple and varying sensor components, wherein said sensor assembly comprises a single molded sensor head configured to include a first cavity and a second cavity;
locating a first sensor of a first sensor type within said first cavity; and
positioning a second sensor of a second sensor type within said second cavity, wherein said first sensor type is different from said second sensor type, such that said first sensor and said second sensor are respectively packaged into said first cavity and said second cavity within said molded sensor head of said sensor assembly to provide a sensor apparatus that provides for multiple and varying sensor capabilities, and wherein said first cavity is separate from said second cavity of said sensor apparatus, thereby providing separate cavities within said single molded sensor head, thereby physically separating said first sensor from said second sensor, yet providing for said single sensor assembly and said sensor apparatus as desired by a customer or user.

16. The method of claim 15 further comprising providing said first sensor as a speed sensor.

17. The method of claim 15 further comprising providing said second sensor as a temperature sensor.

18. The method of claim 15 further comprising providing said first sensor as a speed sensor and said second sensor as a temperature sensor.

19. The method of claim 15 further comprising respectively potting said first and second sensors into said first and second cavities utilizing a thermally-conductive potting.

20. The method of claim 15 further comprising:
connecting said sensor head to a sensor body to form said sensor assembly; and
over molding sensor body over a terminal comprising a plurality of electrical terminal leads that engage said sensor head and said first and second sensors.

* * * * *